No. 707,248. Patented Aug. 19, 1902.
R. A. MOODY.
AXLE NUT WRENCH.
(Application filed Aug. 10, 1901. Renewed May 3, 1902.)
(No Model.)
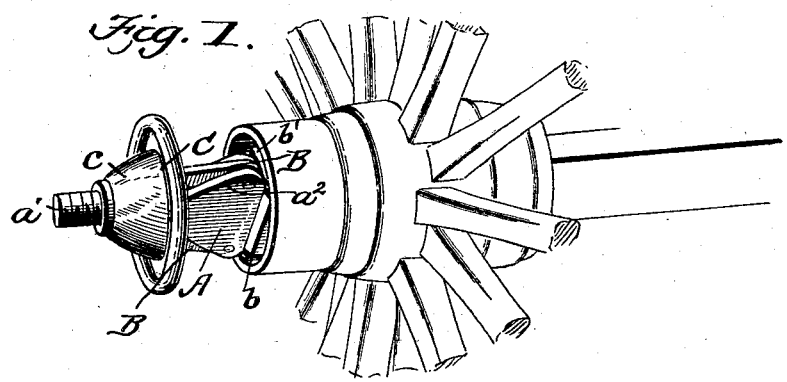
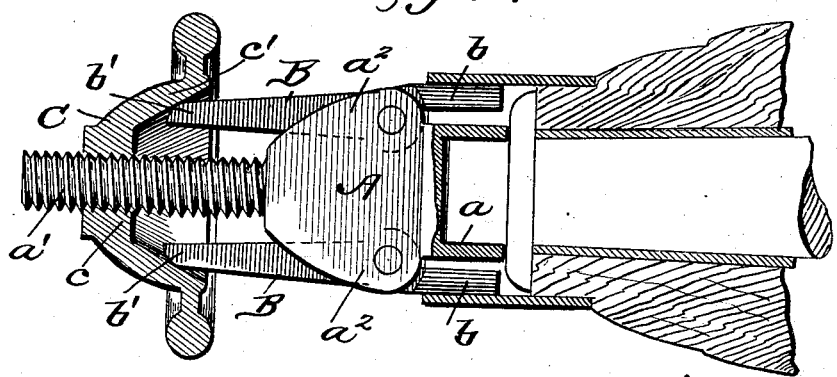
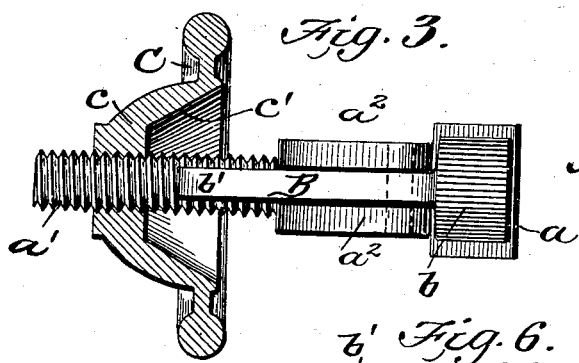
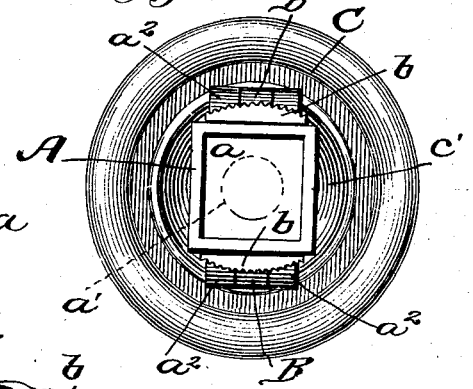
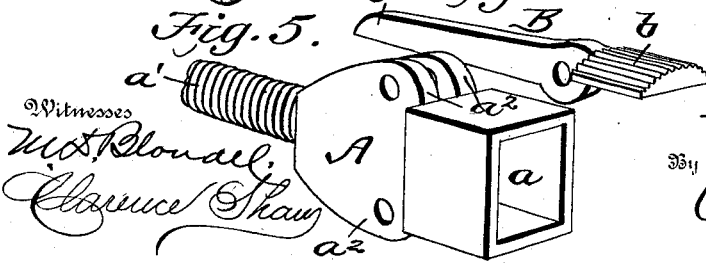
Witnesses
Inventor
R. A. Moody.
Attorneys

UNITED STATES PATENT OFFICE.

ROBERT A. MOODY, OF SELMA, INDIANA.

AXLE-NUT WRENCH.

SPECIFICATION forming part of Letters Patent No. 707,248, dated August 19, 1902.

Application filed August 10, 1901. Renewed May 3, 1902. Serial No. 105,822. (No model.)

*To all whom it may concern:*

Be it known that I, ROBERT A. MOODY, a citizen of the United States, residing at Selma, in the county of Delaware and State of Indiana, have invented a new and useful Axle-Nut Wrench, of which the following is a specification.

My invention is an improvement in wrenches, designed principally for use in removing axle-nuts; and the object thereof is to provide a simple, inexpensive, and easily-operated device whereby the work of removing the axle-nuts may be speedily and easily accomplished.

My improvement has, further, for its object to provide a wrench for clamping the hub-band and nut, so that the nut may be unscrewed by turning the wheel in an opposite direction to the pitch of the threads of the axle-spindle and to hold it firmly in place and in position to be again screwed onto the spindle without the necessity of bringing the hands into contact with the nut.

With these objects in view my improvement consists in the peculiar combination and novel arrangements of parts, as will be fully described in the following specification, reference being had to the accompanying drawings, in which—

Figure 1 is a perspective view of my improvement as in use. Fig. 2 is a sectional elevation of my improvement applied to a nut, the hub of a wheel being shown in section. Fig. 3 is a sectional elevation looking at right angles to that shown in Fig. 2. Fig. 4 is an end elevation. Fig. 5 is a detail perspective view of the section, and Fig. 6 is a detail perspective view of one of the clamping-jaws.

In carrying out my invention I employ a socket-section A, in one end of which is produced a rectangular recess $a$, adapted for the reception of a nut, the opposite end of the section terminating in a threaded shank $a'$, and upon opposite sides of the section, near the socket end, are found ears $a^2$, in which are pivoted clamping-jaws B, the forward ends $b$ of which are broader than the shanks and have their outer surfaces convexed and serrated, adapting them for engagement with the inner surface of the hub-band, as will be explained later on. The rear ends of the shanks $b'$ are beveled and adapted for engagement with the inner surface of the hub of a hand-wheel nut C, the said hub $c$ having a threaded bore through which the shank $a'$ of the socket portion A is adapted to work. The inner face of the hub terminates in an outwardly-flaring collar-section $c'$, whose inner face is preferably arranged on an angle of about forty-five degrees and against which the beveled ends of the shanks of the clamping-jaws B are engaged.

In operation the socket is first placed on a nut of a vehicle-axle and the hand-wheel nut screwed upon the shank of the said socket-section, the bevel-surface of the hub contacting with the shanks of the clamping member, causing the inner end to be pressed in toward the center and the outer ends thrown outwardly, contacting with the inner surface of the band of the hub until a firm hold is secured. Then by turning the wheel in the proper direction the nut is removed from the spindle and will be held within the socket and in position to be again screwed into place when desired.

It will thus be seen that the operation is exceedingly simple, and by reason of the leverage the wheel affords the nut may be screwed upon the spindle with great ease and without the disagreeable necessity of bringing the hands into contact with the nut.

I am aware that the broad idea of removing a nut from the spindle by the action of the wheel is not broadly new; but I do claim by the novel combination and arrangement of parts as shown and described I obtain a more positive, durable, and easily-operated device than has heretofore been upon the market.

Having thus fully described my invention, what I claim as new, and desire to secure by Letters Patent of the United States, is—

1. In a wrench of the kind described, the combination of a socket portion having one end terminating in a threaded shank, clamping-jaws pivoted to the said socket portion, and a hand-wheel nut adapted for engagement with the jaws, substantially as shown and described.

2. In a wrench of the kind described, the combination of a socket portion having a threaded shank formed integral therewith, and a rectangular recess formed therein, clamping-jaws pivoted upon opposite sides of the said socket portion, a hand-wheel nut having its hub provided with a tapering annular recess and adapted for engagement with the clamping-jaws, substantially as shown and described.

3. In a wrench of the kind described the combination of a socket portion having a rectangular recess produced in one end and a threaded shank protruding from the opposite end thereof, ears formed on the said socket portion, clamping-jaws pivoted in the said ears, the heads of said jaws having their outer surfaces convexed and serrated, and the shanks thereof extending past the end of the said socket portion, a hand-wheel hub adapted to operate on the said threaded shank, the hub thereof having a tapering annular recess, the inner surface of which being adapted for engagement with the shanks of the said clamping-jaws, substantially as shown and described.

ROBERT A. MOODY.

Witnesses:
JOSEPH STIFFLER,
CHAS. C. BROWN.